US007380110B1

(12) United States Patent
Nuckolls et al.

(10) Patent No.: US 7,380,110 B1
(45) Date of Patent: May 27, 2008

(54) BRANCH PREDICTION STRUCTURE WITH BRANCH DIRECTION ENTRIES THAT SHARE BRANCH PREDICTION QUALIFIER ENTRIES

(75) Inventors: Robert D. Nuckolls, Santa Clara, CA (US); Rabin A. Sugumar, Sunnyvale, CA (US); Chandra M. R. Thimmannagari, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 298 days.

(21) Appl. No.: 10/660,169

(22) Filed: Sep. 11, 2003

(51) Int. Cl.
*G06F 9/40* (2006.01)
*G06F 9/44* (2006.01)
(52) U.S. Cl. ..................... 712/239; 712/240
(58) Field of Classification Search ............. 712/240, 712/239
See application file for complete search history.

(56) References Cited

U.S. PATENT DOCUMENTS

| 4,370,711 | A | * | 1/1983 | Smith ......................... 712/240 |
| 5,553,255 | A | * | 9/1996 | Jain et al. ................... 712/235 |
| 5,687,360 | A | * | 11/1997 | Chang ........................ 712/240 |
| 5,996,071 | A | * | 11/1999 | White et al. ................ 712/238 |

OTHER PUBLICATIONS

Hennessy, John L. & Patterson, David A., "Computer Architecture: A Quantitative Approach," Third Edition, 2003, Morgan Kaufmann Publishers, San Francisco, CA, pp. 196-215.
Smith, James E., "A Study of Branch Prediction Strategies," Proc. Computer Architecture, 1981, pp. 135-148.
Yeh, T., & Patt, Yale N., "A Comparison of Dynamic Branch Predictors that use Two Levels of Branch History," Proceedings of the 20th Annual International Symposium on Computer Architecture (ISCA 20), 1993, pp. 257-266.
Hilgendorf, R. B., Heim, G. J., Rosenstiel, W., "Evaluation of Branch-Prediction Methods on Traces from Commercial Applications," IBM J. Res. Develop., vol. 43, No. 4, Jul. 1999, pp. 579-593.
Lebeck, Alvin R., "Lecture 7: Dynamic Branch Prediction, Superscalar, VLIW, and Software Pipelining," Computer Science 220, Fall 2001, pp. 1-22 (Slides 1-43); cs.duke.edu/education/courses/fall01/cps220/lectures/lect07-2up.pdf.

* cited by examiner

*Primary Examiner*—Daniel Pan
(74) *Attorney, Agent, or Firm*—Gunnison, McKay & Hodgson, L.L.P.; Forrest Gunnison

(57) ABSTRACT

An efficient branch prediction structure is described that bifurcates a branch prediction structure into at least two portions where information stored in the second portion is aliased amongst multiple entries of the first portion. In this way, overall storage (and layout area) can be reduced and scaling with a branch prediction structure that includes a (2N)K×1 branch direction entries and a (N/2)K×1 branch prediction qualifier entries is less dramatic than conventional techniques. An efficient branch prediction structure includes entries for branch direction indications and entries for branch prediction qualifier indications. The branch direction indication entries are more numerous than the branch prediction qualifier entries. An entry from the branch direction entries is selected based at least in part on a corresponding instruction instance identifier and an entry from the branch prediction qualifier entries is selected based at least in part on least significant bits of the instruction instance identifier.

29 Claims, 6 Drawing Sheets

BRANCH PREDICTION STRUCTURE WITH BRANCH DIRECTION ENTRIES THAT SHARE BRANCH PREDICTION QUALIFIER ENTRIES

BACKGROUND

1. Field of the Invention

The present invention relates to the field of computer architecture. More specifically, the present invention relates to branch prediction storage.

2. Description of the Related Art

Speculative multi-issue processors utilize branch prediction to keep pipelines full despite control hazards and to improve performance. Conventional branch prediction techniques aim to be highly accurate because the benefit provided by a branch prediction technique relates to its accuracy, cost of mispredictions, and frequency of branch instruction instances in code. The cost of mispredictions is the considerable number of cycles wasted on executing the wrong instruction instance and on restoring the processor state.

The trend in branch prediction techniques is to increase both the amount of work performed by processors and the amount of information maintained by processors. As a result, modern branch prediction techniques and implementations tend to increase the area of processors consumed by a branch predictor for logic and storage of history and/or prediction information. Although branch prediction can provide substantial performance improvements, increases in the amount of circuitry and logic area consumed by branch prediction storage can be significant and costly.

Accordingly, techniques are desired whereby branch prediction performance improvements can be achieved with less dramatic increases in layout area and storage.

SUMMARY OF THE INVENTION

It has been discovered that storage allocated in support of branch prediction can be bifurcated into at least two portions where information stored in the second portion is aliased amongst multiple entries of the first portion. In this way, overall storage (and layout area) can be reduced and scaling with a branch prediction structure that includes a (2N)K×1 branch direction entries and a (N/2)K×1 branch prediction qualifier entries is less dramatic than conventional techniques. Sharing branch prediction qualifier entries between branch direction entries reduces branch prediction storage space. Selecting branch prediction qualifier entries based on least significant bits of instruction instance identifiers avoids destructive aliasing and allows for branch prediction performance while reducing consumed processor real estate.

In some realizations, entries of the first portion are employed to encode history (or predictions) of branch direction taken (or not taken) by various branch locations in program code and entries of the second portion encode a prediction qualifier or other attribute potentially associated with multiple aliased entries of the first portion.

In accordance with embodiments of the invention, a processor includes a branch prediction storage that includes storage for branch direction indications and associable branch prediction qualifier indications. The branch direction indication entries are more numerous than the branch prediction qualifier indication entries. In some realizations, aliasing is performed by selecting branch prediction qualifier entries with least significant bits of instruction instance identifiers.

These and other aspects of the described invention will be better described with reference to the Description of the Preferred Embodiment(s) and accompanying Figures.

BRIEF DESCRIPTION OF THE DRAWINGS

The present invention may be better understood, and its numerous objects, features, and advantages made apparent to those skilled in the art by referencing the accompanying drawings.

FIG. 2A depicts a flowchart for performing branch prediction with a reduced area branch predictor according to realizations of the invention. FIG. 2B depicts a flowchart that continues from FIG. 2A according to realizations of the invention.

The use of the same reference symbols in different drawings indicates similar or identical items.

DESCRIPTION OF THE PREFERRED REALIZATION(S)

The description that follows includes exemplary systems, methods, techniques, instruction sequences and computer program products that embody techniques of the present invention. However, it is understood that the described invention may be practiced without these specific details. In other instances, well-known protocols, structures and techniques have not been shown in detail in order not to obscure the invention.

A variety of techniques exist for performing branch prediction and implementing branch predictors, but the following description does not exhaustively describe each of these techniques. The described invention is not limited to particular techniques or schemes for performing branch prediction. Various branch prediction schemes can implement the described invention.

In addition, the following description includes the terms branch direction indication and branch prediction qualifier indication. A branch direction indication indicates the direction of a branch instruction instance with respect to branch prediction. Various realizations of the invention indicate the direction from different perspectives (e.g., the indicated direction may be the previous outcome, the predicted outcome, etc.). A branch prediction qualifier indication indicates the condition of a branch prediction (e.g., varying levels of confidence or strength of predictions that may be past, current, or future, saturation counters, etc.).

Figure 1:
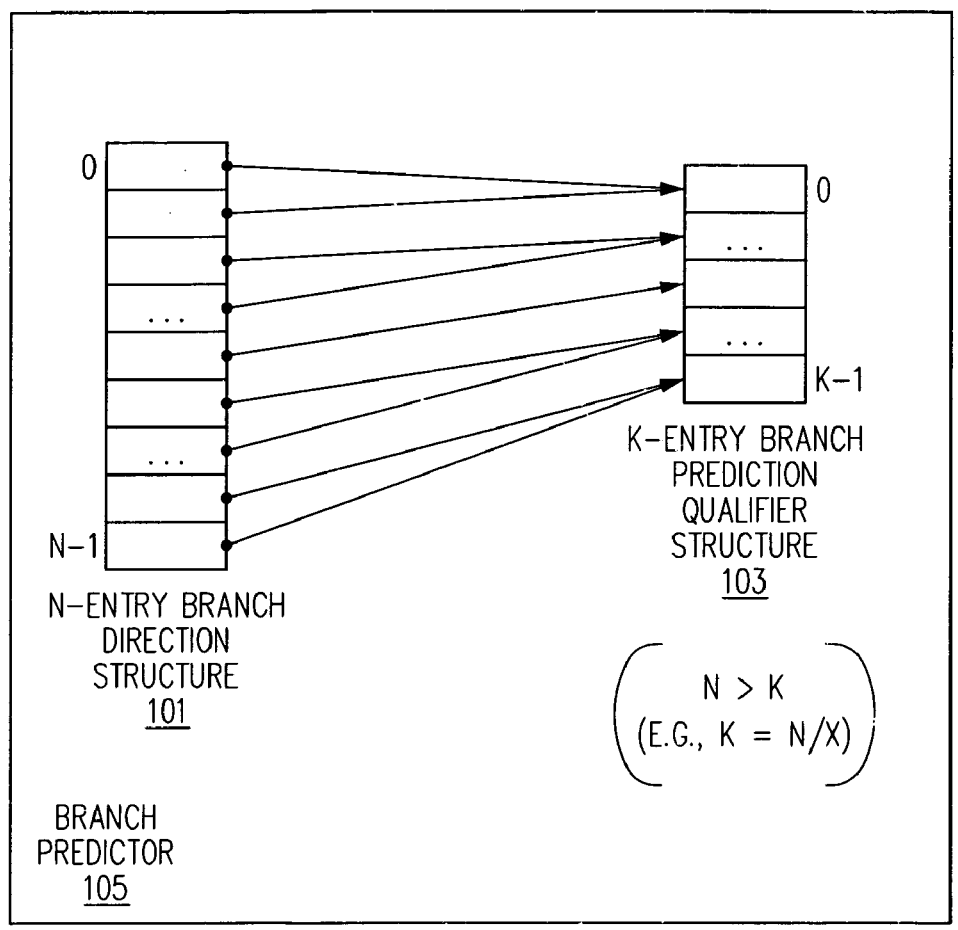
FIG. 1 depicts a conceptual diagram of a branch predictor according to realizations of the invention.

FIG. 1 depicts a conceptual diagram of a branch predictor according to realizations of the invention. A branch predictor 105 includes an N-entry branch direction structure 101 and a K-entry branch prediction qualifier structure. The number of entries in the branch direction structure 101 is greater than the number of entries in the branch prediction qualifier structure 103. After some population, at least some of the entries of the branch direction structure 101 share entries of the branch prediction qualifier structure 103. With a smaller branch prediction qualifier structure 103, the branch predictor 105 requires less space than conventional branch predictors, thus freeing valuable processor real estate.

Figure 2A:
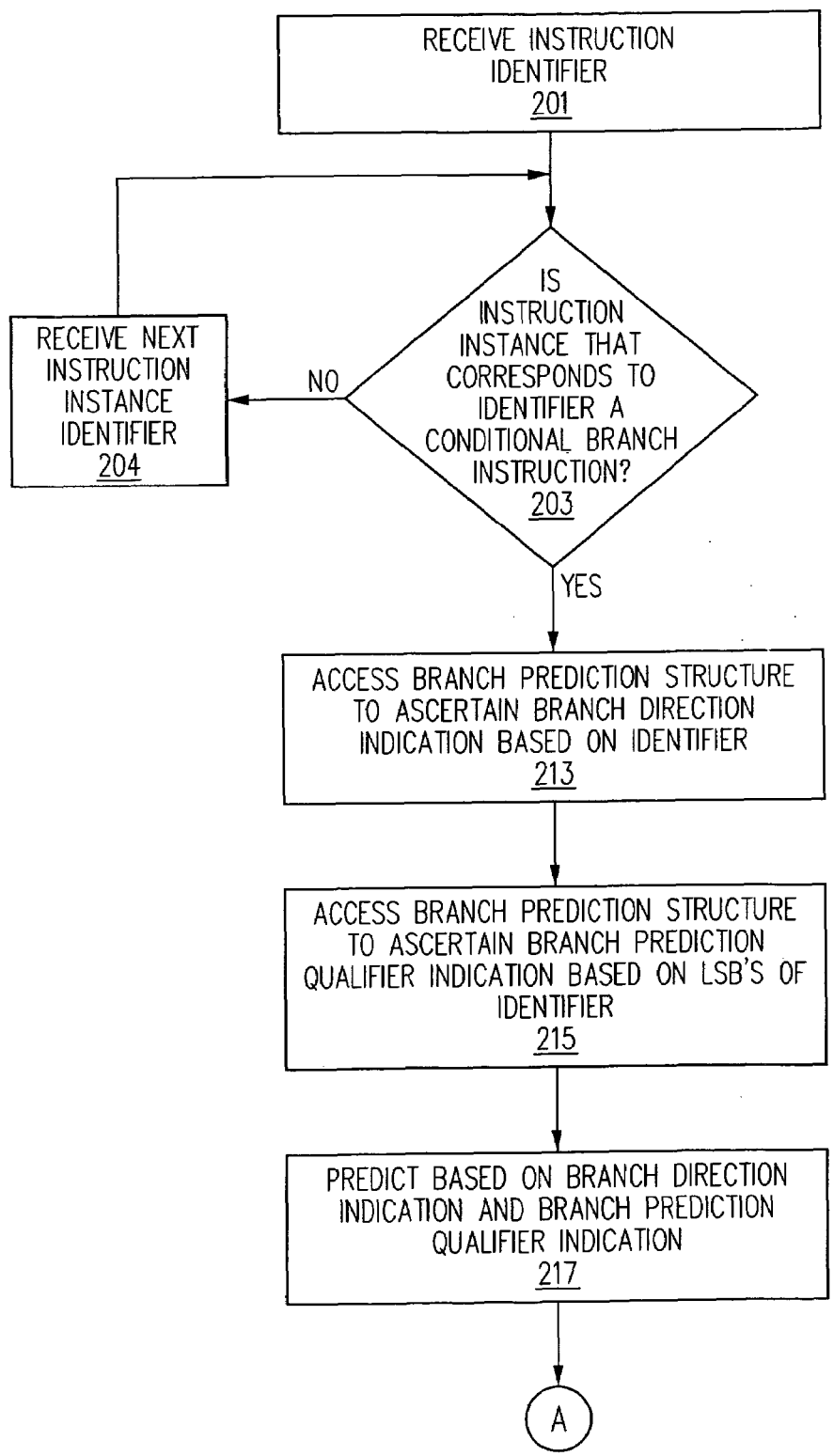
FIGS. 2A-2B depict flowcharts for performing branch prediction according to realizations of the invention.
Figure 2B:
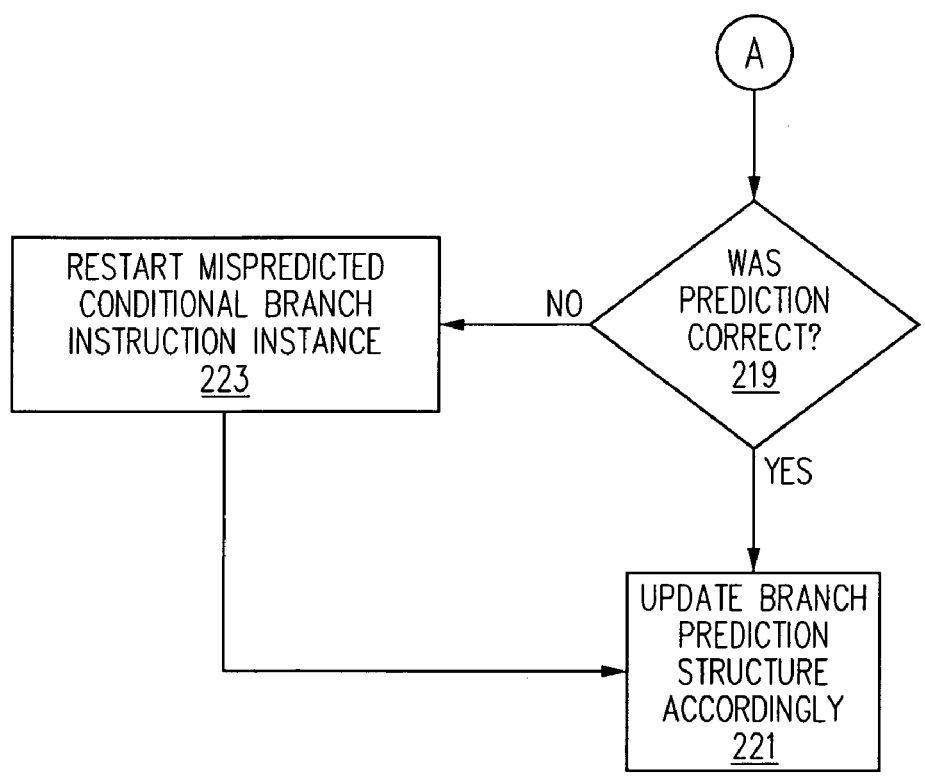

FIGS. 2A-2B depict flowcharts for performing branch prediction according to realizations of the invention. FIG. 2A depicts a flowchart for performing branch prediction with a reduced area branch predictor according to realizations of the invention. At block 201, an instruction instance identifier (e.g., a physical address, a virtual address, a program counter, etc.) is received. At block 203, it is determined if the instruction instance that corresponds to the received instruction instance identifier is a conditional branch instruction. If the corresponding instruction instance is a conditional branch instruction, then control flows to block 213. If the instruction instance is not a branch instruction, then control flows to block 204.

At block 204, the next instruction instance identifier is received. Control flows back to block 203.

At block 213, the branch prediction structure is accessed to ascertain a branch direction indication based at least in part on the instruction instance identifier. At block 215, the branch prediction structure is accessed to ascertain a branch prediction qualifier indication based at least in part on the least significant bits (LSBs) of the instruction instance identifier. Although blocks 213 and 215 describe accessing the branch prediction structure based on the identifier and LSBs of the identifier, a variety of techniques can be used to access the branch prediction structure (e.g., hash of the identifier), where the branch direction indication is selected based on one or more values that correspond to the instruction instance identifier and the branch qualifier indication is selected based on one or more values that corresponds to LSB's of the branch instruction identifier. At block 217, the outcome of the branch instruction instance is predicted based at least in part on the ascertained branch direction indication and the ascertained branch prediction qualifier indication. Control flows from block 217 to FIG. 2B.

FIG. 2B depicts a flowchart that continues from FIG. 2A according to realizations of the invention. At block 219, it is determined if the prediction was correct. If the prediction was correct, then control flows to block 221. If the prediction was not correct then control flows to block 223.

At block 221, the branch prediction structure is updated accordingly. For example, if the branch prediction qualifiers are implemented as strength bits and indicates "weakly taken," then the branch prediction qualifier indication is updated to indicate "strongly taken" or "weakly not taken."

At block 223, the incorrectly predicted conditional branch instruction instance is restarted. Control flows from block 223 to block 221.

While the flow diagram shows a particular order of operations performed by certain realizations of the invention, it should be understood that such order is exemplary (e.g., alternative realizations may perform the operations in a different order, combine certain operations, overlap certain operations, perform certain operations in parallel, etc.). For example blocks 213 and 215 may be performed in parallel, blocks 203 and 207 may be performed in parallel, an additional block before block 213 may apply operations to the instruction instance identifier, etc. Also, block 221 may not be performed for correct predictions. Furthermore, FIGS. 2A-2B refer to instruction instance identifiers for accessing indications. Various realizations of the invention use instruction instance identifiers and/or values derived from or including instruction instance identifiers (e.g., gshare addresses, hashes of addresses, prediction information determined with instruction instance identifiers, etc.).

Figure 3:
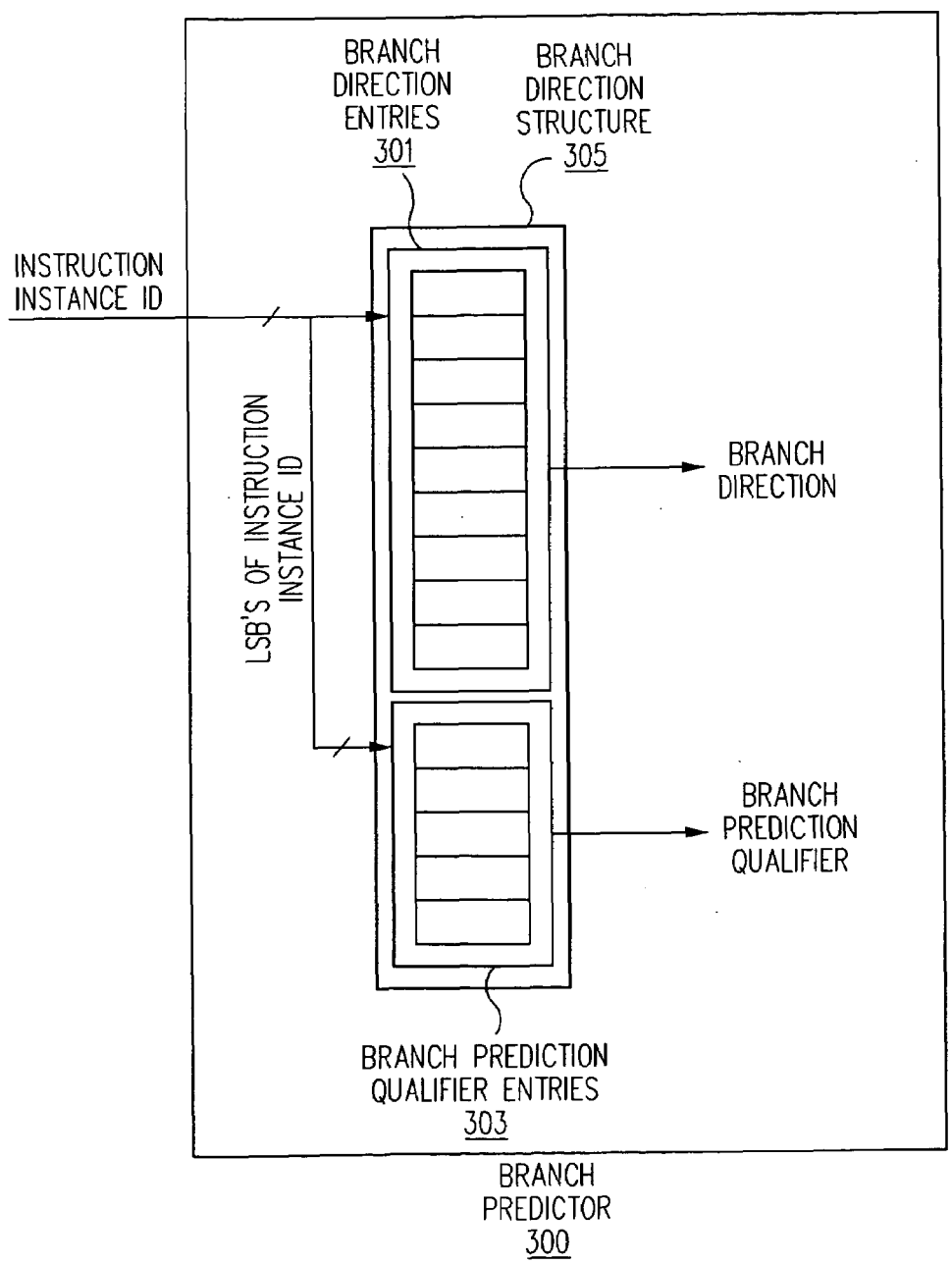
FIG. 3 depicts an exemplary branch predictor according to realizations of the invention.
Figure 4:
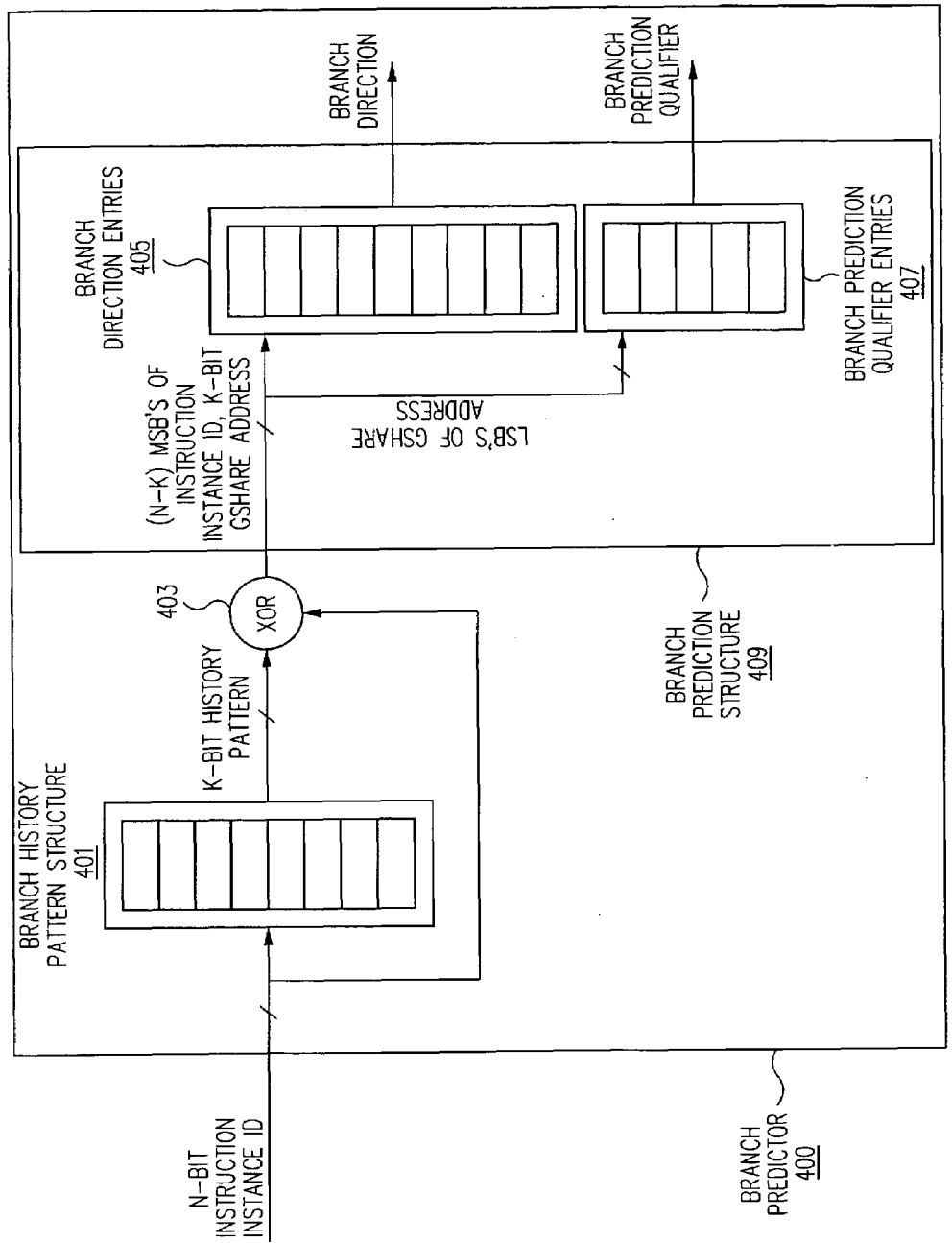
FIG. 4 depicts an exemplary branch predictor that utilizes gshare branch prediction according to realizations of the invention.

FIGS. 3 and 4 illustrate exemplary branch predictors according to realizations of the invention.

FIG. 3 depicts an exemplary branch predictor according to realizations of the invention. FIG. 3 focuses on a branch prediction structure and does not illustrate other typical elements of a branch predictor. In FIG. 3, a branch predictor 300 includes a branch prediction structure 305. The branch prediction structure 305 includes branch direction entries 301 and branch prediction qualifier entries 303. The branch prediction structure 305 includes more branch direction entries 301 than branch prediction qualifier entries 303. Various realizations of the invention implement the branch structure differently (e.g., set associative memory, fully associative memory, direct mapped memory, multi-way associative memory, a combination of different memories, cache, registers, etc.).

The branch predictor 300 receives an instruction instance identifier and accesses one of the branch direction entries 301 with the instruction instance identifier to determine a branch direction indication. The branch predictor 300 accesses one of the entries of the branch prediction qualifier entries 303 with LSBs of the instruction instance identifier to determine a branch prediction qualifier indication.

FIG. 4 depicts an exemplary branch predictor that utilizes gshare branch prediction according to realizations of the invention. In FIG. 4, a branch predictor 400 includes a branch prediction structure 409, a branch history pattern structure 401 (e.g., a branch history pattern shift register), and an XOR gate 403. Although FIG. 4 illustrates a branch history pattern structure, various realizations maintain different information (e.g., target branch instruction instance identifier). In addition, the branch history pattern structure may be for individual branch instruction instance histories, global histories, etc. The branch prediction structure 409 includes branch direction entries 405 and branch prediction qualifier entries 407.

The branch predictor 400 receives an N-bit instruction instance identifier and accesses the branch history pattern structure 401 to determine a K-bit history pattern. The N-bit instruction instance identifier and the history pattern flow into the XOR gate 403. The XOR gate 403 XORs the K least significant bits of the instruction instance identifier with the history pattern and generates a (N-K) MSBs of the instruction instance identifier and a K-bit gshare address. The branch predictor 400 accesses the branch prediction structure 409 and selects a branch direction indication from the branch direction entries 405 based at least in part on the (N-K) MSBs of the instruction instance identifier and the gshare address. The branch predictor 400 also selects a branch prediction qualifier indication from the branch prediction qualifier entries 407 based at least in part on LSBs of the gshare address.

Various realizations of the invention vary the number of LSBs used for accessing the branch prediction qualifier entries 407 (e.g., the entire gshare address, the gshare address and some of the MSBs of the instruction instance identifier, etc.). For example, the LSBs of the gshare address used for selecting the branch prediction qualifier indication may be anything from the bottom least significant bit to the N-K-1 MSBs and the gshare address. Since the LSBs of the gshare address (i.e., LSBs of the instruction instance identifier) are used to select the branch prediction qualifier entry, branch instruction instances within the same spatial locality, according to the LSBs of the instruction instance identifier, and that have other similar information in the branch prediction structure (e.g., same branch history pattern, same branch target instruction instance identifier, etc.) do not share branch prediction qualifier entries. Instead, conditional branch instruction instances in different regions of code with the same additional information (e.g., branch history pattern, target branch instruction instance identifier, etc.) share prediction qualifier indications. Sharing prediction qualifier indications between conditional branch instruction instances avoids destructive aliasing and allows for a reduced area branch predictor without negatively impacting performance. A reduced area branch predictor that causes branch instruction instances in different regions of code to share prediction qualifier information maintains less information while maintaining desirable performance without consuming valuable processor space.

In either of the exemplary branch predictors depicted in FIG. 3 or FIG. 4, an (N) kilobyte, (N/8)-way internal cache supports a (2N)K×1 branch, direction structure and a (N/2) K×1 branch prediction qualifier structure. For example, a 64 KB, 8-way internal cache would support a branch prediction structure with 128K branch direction entries and 32K branch prediction qualifier entries, instead of a 128K×2 branch prediction structure.

The described invention may be provided as a computer program product, or software, that may include a machine-readable medium having stored thereon instructions, which may be used to program a computer system (or other electronic devices) to perform a process according to the present invention. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, optical, acoustical or other form of propagated signal (e.g., carrier waves, infrared signals, digital signals, etc.); or other types of medium suitable for storing electronic instructions.

Figure 5:
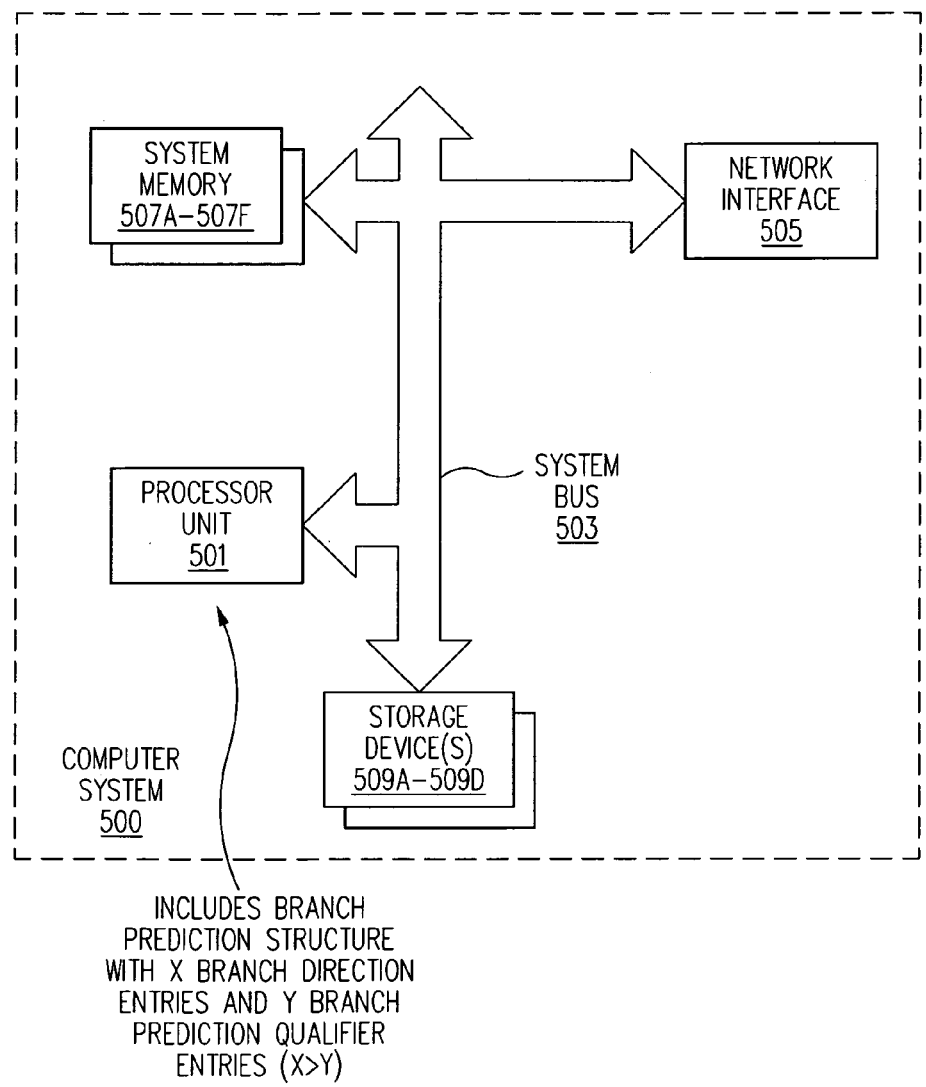
FIG. 5 depicts an exemplary computer system according to realizations of the invention.

FIG. 5 depicts an exemplary computer system according to realizations of the invention. A computer system 500 includes a processor unit 501 (possibly including multiple processors). The processor unit 501 includes a reduced area branch prediction structure with X branch direction entries and Y branch prediction qualifier entries (X>Y). The computer system 500 also includes a system memory 507A-507F (e.g., one or more of cache, SRAM DRAM, RDRAM, EDO RAM, DDR RAM, EEPROM, etc.), a system bus 503 (e.g., LDT, PCI, ISA, etc.), a network interface 505 (e.g., an ATM interface, an Ethernet interface, a Frame Relay interface, etc.), and a storage device(s) 509A-509D (e.g., optical storage, magnetic storage, etc.). Realizations of the invention may include fewer or additional components not illustrated in FIG. 5 (e.g., video cards, audio cards, additional network interfaces, peripheral devices, etc.). The processor unit 501, the storage device(s) 509A-509D, the network interface 505, and the system memory 507A-507F are coupled to the system bus 503. Although FIG. 5 illustrates the processor unit 501 as including the branch prediction structure, various realizations of the invention implement the branch prediction structure differently (e.g., storage separate from the processor, storage in a co-processor, etc.).

While circuits and physical structures are generally presumed, it is well recognized that in modern semiconductor and design fabrication, physical structures and circuits may be embodied in computer readable descriptive form suitable for use in subsequent design, test, or fabrication stages as well as in resultant fabricated semiconductor integrated circuits. Accordingly, claims directed to traditional circuits or structure may, consistent with particular language thereof, read upon computer readable encodings and representations of same, whether embodied in media or combined with suitable reader facilities to allow fabrication, test, or design refinement of the corresponding circuits and/or structures.

While the invention has been described with reference to various realizations, it will be understood that these realizations are illustrative and that the scope of the invention is not limited to them. Many variations, modifications, additions, and improvements are possible. More generally, realizations in accordance with the present invention have been described in the context of particular realizations. These realizations are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A processor comprising:
a bus for carrying at least a portion of an instruction instance identifier;
a branch prediction storage, connected to said bus, including:
branch direction storage, connected to said bus and having a first output for providing a branch direction indication, for storing entries for branch direction indications,
wherein each branch direction indication stored in said branch direction storage indicates a direction of a branch instruction instance with respect to branch prediction; and
in response to said at least a portion of said instruction instance identifier, a branch direction indication associated with that instruction instance identifier is provided on said first output; and
branch prediction qualifier indications storage connected to at least a portion of said bus and having a second output for providing a branch predication qualifier indication, for storing entries for branch prediction qualifier indications,
wherein in response a signal on said at least a portion of said bus, a branch prediction qualifier indication associated with said at least a portion of said instruction instance identifier is provided on said second output;
wherein said entries in said branch direction indications storage are more numerous than said entries in said branch prediction qualifier indications storage; and
an outcome of said branch instruction instance is predicted based at least in part on said branch direction indication on said first output and said branch prediction qualifier indication on said second output.

2. The processor of claim 1 wherein, during execution of program code on the processor, at least some of the branch prediction qualifier entries are associated with multiple ones of the branch direction entries.

3. The processor of claim 1 wherein the branch direction indications and the branch prediction qualifier indications are accessible based at least in part on one or more of instruction instance identifiers and gshare addresses.

4. The processor of claim 3 wherein the branch prediction qualifier indications are accessible based at least in part on one or more of least significant bits of the instruction instance identifiers and least significant bits of the gshare addresses.

5. The processor of claim 3 wherein the instruction instance identifiers comprise one of program counters, physical addresses, and virtual addresses.

6. The processor of claim 1 wherein the branch prediction storage comprises storage for one or more of branch history pattern indications and branch target instruction instance identifiers.

7. The processor of claim 1 wherein the branch direction indications comprise one or more bits that indicate one or more of branch history, branch prediction, and branch pattern.

8. The processor of claim 1 wherein the branch prediction qualifier indications comprise one or more bits that indicate one or more of confidence, strength, and validity of branch direction indications.

9. A branch prediction storage structure including:
   branch direction storage, connected to a bus for carrying at least a portion of an instruction instance identifier and having a first output for providing a branch direction indication, for storing entries for branch direction indications,
     wherein each branch direction indication stored in said branch direction storage indicates a direction of a branch instruction instance with respect to branch prediction; and
     in response to said at least a portion of said instruction instance identifier, a branch direction indication associated with that instruction instance identifier is provided on said first output; and
   branch prediction qualifier indications storage, connected to at least a portion of said bus and having a second output for providing a branch predication qualifier indication, for storing entries for branch prediction qualifier indications
     wherein in response a signal on said at least a portion of said bus, a branch prediction qualifier indication associated with said at least a portion of said instruction instance identifier is provided on said second output;
     the branch direction indication entries are more numerous than the branch prediction qualifier indications; and
     an outcome of said branch instruction instance is predicted based at least in part on said branch direction indication on said first output and said branch prediction qualifier indication on said second output.

10. The branch prediction storage of claim 9 wherein the branch direction indications and the branch prediction qualifier indications are accessible based at least in part on one or more of instruction instance identifiers and gshare addresses.

11. The branch prediction storage of claim 10 wherein instruction instance identifiers include physical addresses, virtual addresses, and program counters.

12. The branch prediction storage of claim 9 wherein the branch prediction storage also includes entries for one or more of branch history patterns and branch target instruction instance identifiers.

13. The branch prediction storage of claim 9 wherein the branch prediction qualifier indications include one or more bits that indicate one or more of confidence, strength, and validity of branch direction indications.

14. The branch prediction storage of claim 9 wherein the branch direction indications include one or more bits that indicate whether a branch is taken or not taken.

15. A method of operating a processor that supports branch prediction, the method comprising:
   accessing a branch prediction structure connected to a bus for carrying at least a portion of an instruction instance identifier that corresponds to a branch instruction instance;
   determining from the branch prediction structure a branch direction indication that corresponds to said at least a portion of the instruction instance identifier; and
   determining from the branch prediction structure a branch prediction qualifier indication that corresponds to said at least a portion of the instruction instance identifier,
     wherein the branch prediction structure includes more entries for branch direction indications than entries for branch prediction qualifier indications;
     said branch direction indication indicates a direction of said branch instruction instance with respect to branch prediction and the branch direction indication is associated with said at least a portion of the instruction instance identifier; and
     an outcome of said branch instruction instance is predicted based at least in part on said branch direction indication and said branch prediction qualifier.

16. The method of claim 15 wherein determining the branch direction indication and the branch prediction qualifier indication is based at least in part on the instruction instance identifier and at least in part on the least significant bits of the instruction instance identifier, respectively.

17. The method of claim 16 wherein determining the branch direction indication comprises obtaining one or more values from one or more operations on the instruction instance identifier and selecting the branch direction indication that corresponds to the value.

18. The method of claim 17 wherein determining the branch direction indication comprises selecting the branch prediction qualifier indication with least significant bits of the obtained one or more values.

19. The method of claim 18 wherein at least some of the least significant bits of the obtained one or more values are unchanged from the instruction instance identifier.

20. The method of claim 15 further comprising determining one or more of a branch history pattern and a branch target instruction instance identifier that corresponds to the instruction instance identifier.

21. The method of claim 20 further comprising determining the branch direction indication with the instruction instance identifier and one or more of the branch history pattern and the instruction instance identifier.

22. The method of claim 15 wherein the instruction instance identifier includes one or more of physical addresses, virtual addresses, and program counters.

23. The method of claim 15 further comprising performing branch prediction based at least in part on the determined branch direction indication and the determined branch prediction qualifier indication.

24. The method of claim 15 further comprising updating the branch prediction qualifier indication and the branch direction indication with respect to outcome of the instruction instance that corresponds to the instruction instance identifier.

25. A method of operating a processor that supports branch prediction, the method comprising:
- determining if an instruction instance is a branch instruction and if the instruction instance is represented in a branch prediction structure;
- if the instruction instance is a branch instruction and is represented in the branch prediction structure,
  - selecting in the branch prediction structure a branch direction indication that corresponds to an instruction instance identifier that corresponds with the instruction instance, and
  - selecting in the branch prediction structure a branch prediction qualifier indication that corresponds to the instruction instance identifier; and
- performing branch prediction wherein an outcome of said branch prediction is based at least in part on the branch direction indication and the branch prediction qualifier indication,
  - wherein the branch prediction qualifier indication is aliased to multiple branch direction indications; and said branch direction indication indicates a direction of said branch instruction with respect to branch prediction.

26. The method of claim 25 wherein the branch direction indication is selected based at least in part on one or more of least significant bits of the instruction instance identifier and least significant bits of a gshare address.

27. The method of claim 25 wherein the instruction instance identifier includes one or more of physical addresses, virtual addresses, and program counters.

28. The method of claim 25 further comprising updating the branch direction indication and the branch prediction qualifier based at least in part on an outcome of the instruction instance.

29. The method of claim 25 wherein the branch prediction qualifier indication is one or more bits that indicate one or more of confidence, strength, and validity of branch direction indications.

* * * * *

UNITED STATES PATENT AND TRADEMARK OFFICE
CERTIFICATE OF CORRECTION

| | |
|---|---|
| PATENT NO. | : 7,380,110 B1 |
| APPLICATION NO. | : 10/660169 |
| DATED | : May 27, 2008 |
| INVENTOR(S) | : Robert D. Nuckolls, Rabin A. Sugumar and Chandra M.R. Thimmannagari |

It is certified that error appears in the above-identified patent and that said Letters Patent is hereby corrected as shown below:

In Column 7, Claim 9, Line 41, replace "predication" with --prediction--.

Signed and Sealed this

Fourteenth Day of October, 2008

JON W. DUDAS
*Director of the United States Patent and Trademark Office*